Dec. 26, 1939.   W. E. SAXE   2,184,435
WALKING BEAM BEARING
Filed Aug. 2, 1937   2 Sheets-Sheet 1
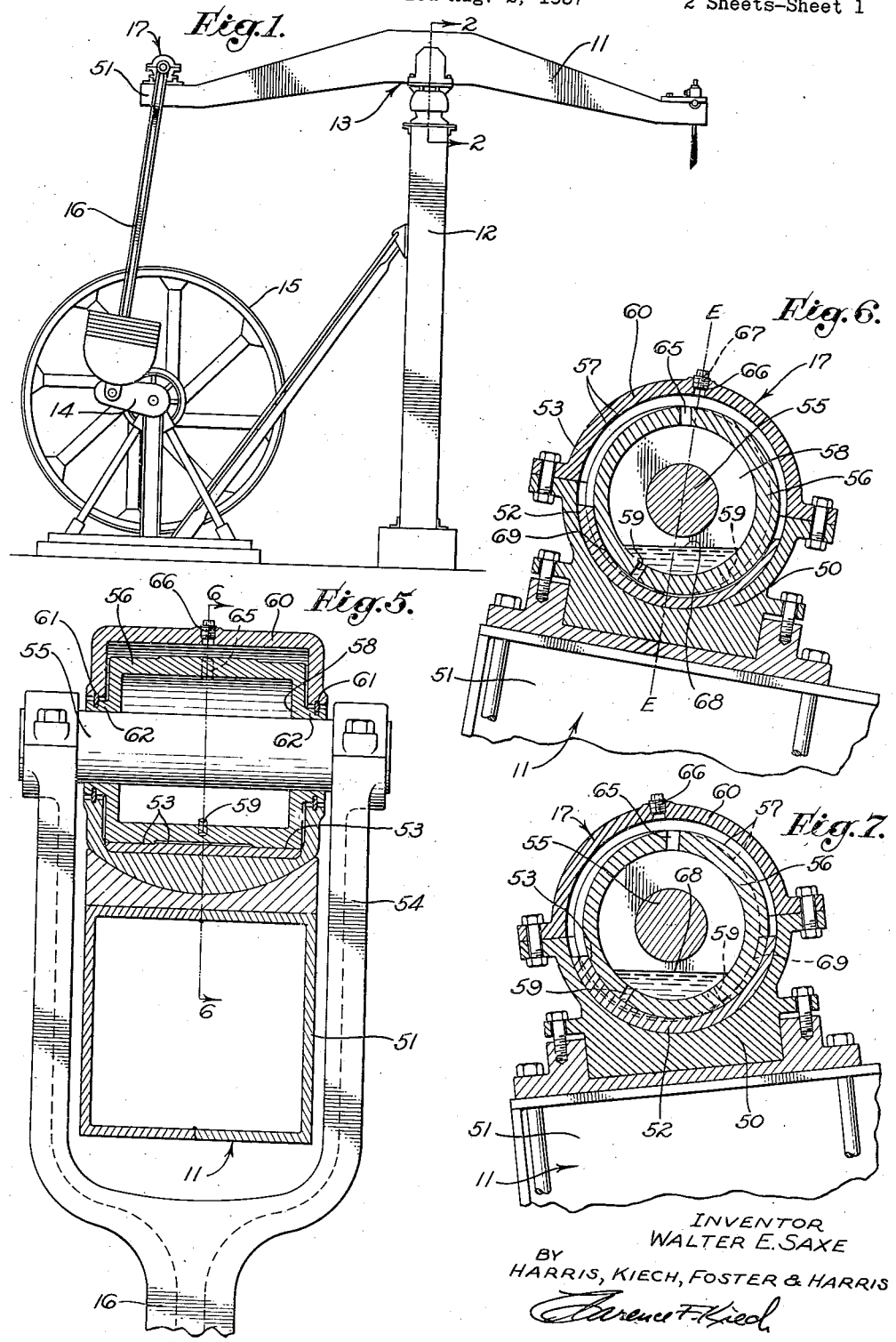
INVENTOR
WALTER E. SAXE
BY
HARRIS, KIECH, FOSTER & HARRIS
ATTORNEYS

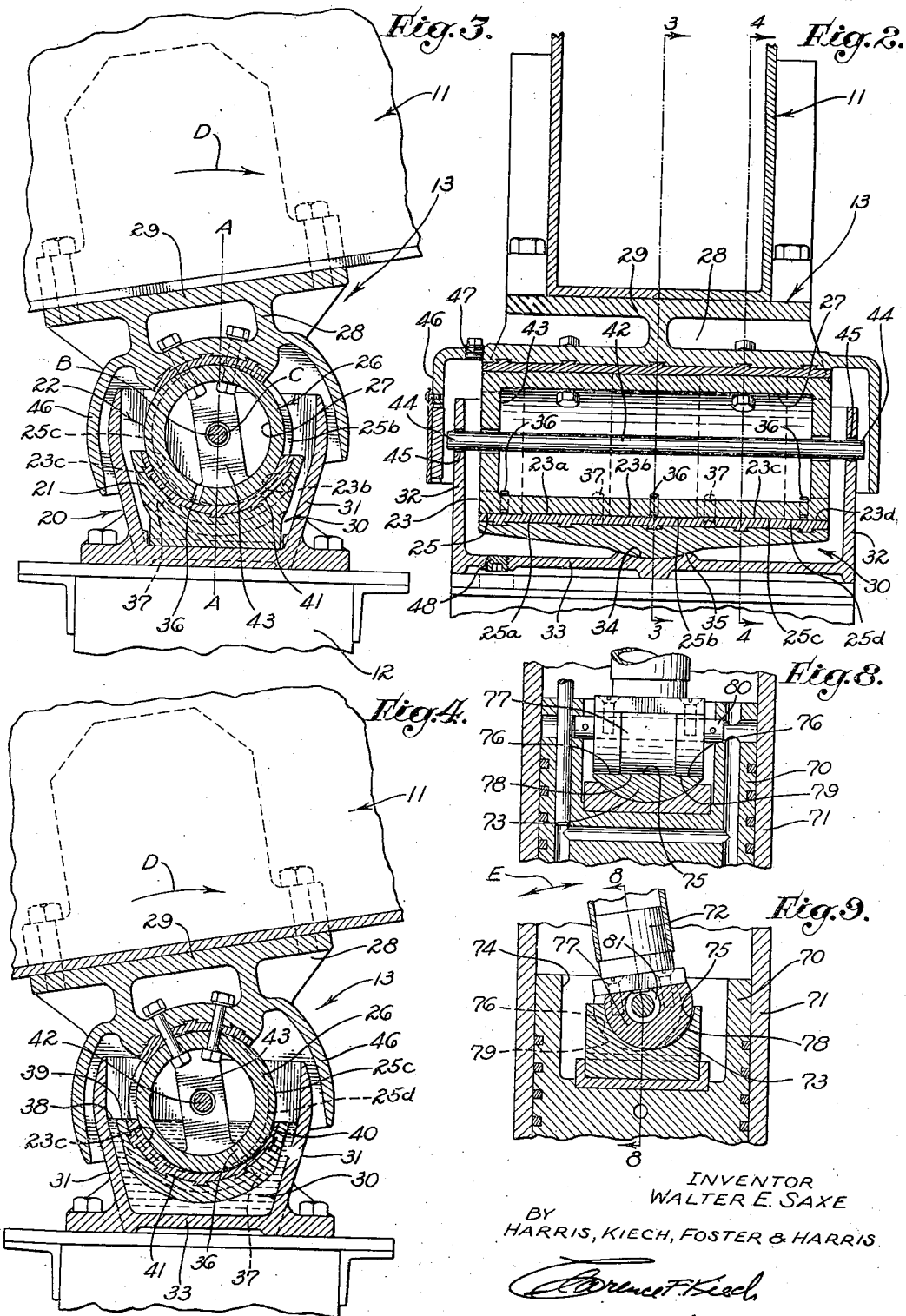

Patented Dec. 26, 1939

2,184,435

UNITED STATES PATENT OFFICE 2,184,435

WALKING BEAM BEARING

Walter E. Saxe, Alhambra, Calif.

Application August 2, 1937, Serial No. 156,980

15 Claims. (Cl. 308—121)

My present invention relates to bearings and the lubrication thereof, and more particularly to a method of and apparatus for lubricating oscillating bearings, such as oil well walking beam bearings.

In the oil well industry, particularly in connection with pumping equipment, it has been found that plain bearings are the only feasible type of bearings for use with the heavy equipment necessary to pump a deep well. On the other hand, this type of bearing, while being the most practical available, has never been satisfactory due to the difficulty of lubricating the bearing surfaces. This is especially true of walking beam bearings, both the main bearing of the walking beam and the pitman bearing. Due to the tremendous pressure to which such bearings are subjected, it has heretofore been impossible to efficiently introduce lubricant between the relatively oscillating bearing surfaces of such a plain bearing. Various ways have been devised in an attempt to distribute lubricant between such bearing surfaces, which ordinarily comprised channeling the engaging surfaces of the bearing to provide for flow of lubricant under pressure between the surfaces. This method has been found unsatisfactory for the reason that due to the pressure of the bearing load, the lubricant would contact only the surfaces along the course of the oil channel formed in the surfaces and would not be distributed over the entire surface, with the result that the complementary bearing surfaces would be "scored" in the portions where no lubricant was directly delivered to the bearing surfaces. This practice of channeling the bearing surfaces also reduced the available area of the bearing surfaces to an unsatisfactory degree.

It is therefore an object of my invention to provide an oscillating bearing, suitable for use in journaling an oil well walking beam, or the like, including unique features permitting lubricant to be introduced between the plain bearing surfaces at atmospheric pressure, in such a manner that the lubricant will be distributed over the entire area of the bearing surfaces.

It is another object of my invention to provide an oscillating bearing, suitable for use as a main bearing for an oil well walking beam, a pitman bearing for a walking beam, a connecting rod bearing for pistons which are reciprocated by an oscillating crank, and the like, which includes a plurality of bearing surfaces relatively offset in such a manner that certain of the bearing surfaces are spaced from their complementary journaling surfaces at one stage in the oscillatory movement of the bearing while certain other complementary bearing surfaces take the load on the bearing, so that lubricant may be introduced between the spaced surfaces at atmospheric pressure and expelled from between these bearing surfaces when the load of the bearing is supported thereby, at a different stage in the oscillation of the bearing, thus causing a new supply of lubricant to be delivered to the respective bearing surfaces during each oscillatory movement of the bearing.

A further object of the invention resides in the provision of means for delivering a lubricant at atmospheric pressure to the space between the separated bearing surfaces, described in the above paragraph.

It is another object of my invention to provide in an oscillatory bearing, as described above, a plurality of relatively offset bearing surfaces which are so related to the degree of oscillation of the bearing and to the thickness of a flowing film of a desired lubricant employed that the bearing surfaces at one stage in the oscillatory movement thereof will be spaced apart a greater distance than the thickness of the flowing film of lubricant employed.

These and other objects of the invention reside in the method of lubricating such an oscillating bearing, as well as in the details of construction of the various forms of my apparatus which will be fully disclosed in the following part of the specification in connection with the accompanying drawings.

In the drawings:

Fig. 1 is a utility view illustrating the use of my novel bearing construction, involving my new method of lubrication, in connection with a standard type of oscillating walking beam ordinarily used in oil well pumping equipment.

Fig. 2 is a vertical section through the main bearing of the walking beam illustrated in Fig. 1, this view being taken on a median plane as indicated by the line 2—2 of Fig. 1.

Fig. 3 is a vertical section taken as indicated by the line 3—3 of Fig. 2.

Fig. 4 is a vertical section taken as indicated by the line 4—4 of Fig. 2.

Fig. 5 is a vertical section on a median plane through the pitman bearing indicated in Fig. 1.

Figs. 6 and 7 are vertical sectional views taken as indicated by the line 6—6 in Fig. 5, showing the oscillatory pitman bearing in two opposite extreme positions.

Figs. 8 and 9 are vertical sectional views through a bearing incorporating the novel features of my invention and illustrating the adaptability of my bearing for use as a connecting rod bearing for a piston, these views being taken at right angles on substantially vertical planes.

In the drawings, I show a walking beam 11 pivoted to a Samson post 12 by a central main bearing, incorporating the features of my invention, designated generally by the numeral 13. The walking beam 11, as is standard practice, is journaled by the bearing 13 to reciprocate in a vertical plane, and is driven by a crank 14 responding to the rotation of a band wheel 15, which crank is connected to the walking beam 11 through a pitman 16 and a bearing 17, which in the instance illustrated also embodies the features of my invention.

The central bearing, or main bearing, of the walking beam 13 is illustrated in detail in Figs. 2, 3, and 4, and in its preferred embodiment includes a bed 20 providing a journal member 21, the bed being fixed to the upper end of the vertical Samson post 12 in any suitable manner, such as by bolting the bed 20 to a horizontal plate secured to the upper end of the Samson post 12, substantially in the manner shown; and a bearing member generally designated by the numeral 22, supported by the journal member 21 and fixed to the walking beam 11 to journal the same for vertical reciprocation.

The journal member 21 is formed to provide a plurality of journaling surfaces 23, 23a, 23b, 23c, and 23d, which form upwardly faced, arcuate, substantially semi-circular cradles, in the manner shown. The bearing surfaces 23 to 23d are relatively offset with respect to a central plane A—A, extending transversely through the arcuate surfaces. In other words, the arcuate journaling surfaces 23 to 23d are eccentric to each other and to the central plane A—A of the bearing 13, the axes B and C from which the journaling surfaces are alternately described being offset on opposite sides of the central plane A—A of the bearing 13, substantially in the manner shown in Figs. 3 and 4.

The bearing member 22 is formed to provide cylindrical bearing surfaces 25, 25a, 25b, 25c, and 25d, respectively complementary to the journaling surfaces 23 to 23d, the axes of the bearing surfaces 25 to 25d being offset with respect to the central plane A—A to the same degree as the journaling surfaces 23 to 23d.

While it is not necessary to provide for a rotational oscillation of the bearing member relative to the journaling member of more than approximately 5° in opposite directions, I prefer to provide the bearing member 22 with a thrust member 26 upon which the bearing surfaces 25 to 25d are formed, or otherwise fixedly attached, in the form of a cylindrical shell providing an interior chamber 27. In the form being described, the thrust member 26 is secured, as by bolts or other suitable means, to a bracket member 28 providing a table 29 upon which the walking beam 11 is fixedly supported.

In other instances it will be seen that the thrust member 26 need not be fully cylindrical, the lineal dimensions of the arcuate bearing surfaces being determined by the desired degree of oscillation of the member supported by the bearing.

My invention includes means for introducing a lubricant between the respective bearing surfaces at certain stages in the oscillatory movement of the bearing. One convenient means for accomplishing this purpose comprises an oil reservoir 30 formed by upwardly extending side walls 31 and end walls 32, formed integrally with the bed 20 substantially in the manner shown. In the preferred form, as shown best in Figs. 2 and 3, the bed 20 provides a lower wall 33 providing a concave seat 34 in which the journal member 21 is supported, the journal member 21 being provided with a contoured surface 35 complementary to the seat 34. This manner of supporting the journal member 21 permits slight longitudinal tilting of the journal member relative to the horizontal plane of the bed 20 to compensate for possible lateral weaving of the Samson post 12 with respect to the longitudinal axis of the walking beam 11.

Formed in the thrust member 26 and communicating between the chamber 27 and each of the bearing surfaces 23 to 23d are a plurality of oil ports 36. Likewise, formed in the journal member 21 are a plurality of ports 37 which communicate between the reservoir 30 and certain of the journaling surfaces 23 to 23d.

In the operation of my bearing, the reservoir 30 is intended to be filled with oil to substantially the level indicated at 38, preferably even with the upper surface 39 of the journal member 21. As the walking beam 11, driven by the pitman 16, reciprocates longitudinally, a rotational oscillation is imparted to the thrust member 26 so that relative slidable oscillatory movement occurs between the bearing surfaces 25 to 25d and the complementary journaling surfaces 23 to 23d. At certain stages in the rotational oscillation of the thrust member 26, portions of certain of the bearing surfaces will be spaced from their complementary journaling surfaces, as indicated at 40 in Fig. 4, while certain bearing surfaces adjacent the spaced surfaces fully engage their complementary journaling surfaces throughout the length thereof to support the bearing load. In other words, as the walking beam 11 or other supported member oscillates and the thick portions of the walls of the hollow bearing member 22 on one side thereof move out of contact with their complementary journaling surfaces, the thick portions of the bearing member 22 on the other side move into contact with their complementary lower journaling surfaces. In the form shown, the complementary bearing surfaces and journaling surfaces are relatively offset so that alternate bearing surfaces, for instance the bearing surfaces 23, 23b, and 23d, will be spaced from their complementary journaling surfaces, as indicated at 40, while the intermediate bearing surfaces 23a and 23c fully engage their complementary journaling surfaces to support the load of the bearing. As such spacing of portions of certain of the bearing surfaces occurs, preferably at the extreme rotational position of the bearing thrust member, lubricant may flow through the ports 36 and the ports 37 into engagement with the bearing surfaces. It will be seen that since the walls forming the reservoir 30 are open to the atmosphere, and since the cylindrical thrust member is in open communication with the body of lubricant in the reservoir 30, the lubricant is introduced between the bearing surfaces and journaling surfaces when they are spaced apart at atmospheric pressure. It is an essential feature of my novel apparatus and method that the degree of oscillation of the thrust member and the degree of eccentricity or offset of the bearing surfaces and journaling surfaces are so related to the thickness of a flowing film of the desired lubricant that the space between the bearing surfaces and the journaling surfaces at the maximum degree of oscillation is greater than the thickness of such flowing film of lubricant. As the oscillatory movement of the thrust member continues in a rightward direction, as indicated by the arrow D of Figs. 3 and 4, it will be seen that the lubricant which has flowed between the bearing surfaces and journaling surfaces gravitationally at atmospheric pressure will be forced outwardly from between the surfaces under a pressure determined by the bearing load progressively exerted upon the journaling surfaces 23a and 23c as the thrust member rotates into its extreme position opposite to that indicated in Figs. 3 and 4, at which time alternate bearing surfaces will be spaced from their complementary journaling surfaces. It will thus be seen that in my novel method of lubricating reciprocating bearings, lubricant is introduced between complementary bearing surfaces at atmospheric pressure and is expelled from between the surfaces at relatively high pressure, with the result that with each reciprocating movement of the thrust member each of the bearing surfaces is contacted by a fresh supply of lubricant covering substantially the entire area of the bearing surfaces. In this manner, the difficulties attendant to the general practice of endeavoring to force lubricant under high pressure between two plane surfaces under load are overcome.

In practical installations of my bearing, I prefer to provide the journaling member 21 with inserts 41 of bronze or Babbitt metal which provide the journaling surfaces 23 to 23d and to form the thrust member of hardened steel.

In practice, certain other structural refinements not necessarily included in the primary concept of my invention may be included in the structure. For instance, I prefer to provide in connection with the structure just described a retaining rod 42 which extends axially through the thrust member 26 and is loosely retained by end webs 43 formed integrally with the thrust member, as shown, the outer end 44 of the retaining rod 42 extending through relatively enlarged openings 45 formed in the end walls 32 of the reservoir 30. The retaining rod, while permitting slight longitudinal tilting of the thrust member 26 relative to the Samson post 12, serves to prevent the walking beam and the thrust member, fixed thereto, from separation from the journal member 21.

In the embodiment shown, the bracket member 28 is provided with depending walls 46 which form an apron entirely covering and surrounding the upper ends of the walls 31 and 32 forming the reservoir 30, to prevent undue contamination from falling particles of foreign matter. Also, the device embodied in the illustrations Figs. 2, 3, and 4 preferably includes removable oil plugs 47 and 48 for the replenishment and draining of the oil supply in the reservoir 30.

My invention likewise contemplates the use of my novel bearing and method of lubricating the same in connection with the pitman of an oil well pumping apparatus. Such an embodiment of my invention is disclosed in Figs. 5, 6, and 7 and includes a bed 50 suitably mounted on the rearward end 51 of the walking beam 11, the bed including a bronze or babbitt insert 52 forming a plurality of journaling surfaces 53 eccentric to each other and likewise eccentric to the central transverse plane through the surfaces 53, in the same manner as described in connection with the form previously described. In this adaptation, the pitman 16 is provided at the upper end thereof with a yoke 54 in which a cross-shaft 55 is fixedly mounted, the cross-shaft 55 in turn being fixedly connected to a thrust member 56 providing a plurality of bearing surfaces 57 respectively complementary to the arcuate journaling surfaces 53. The arcuate bearing surfaces of the thrust member are offset to the same degree with respect to the plane E—E as the journaling surfaces 53.

The thrust member 56 is preferably of hollow cylindrical form so as to provide an interior oil chamber 58. Formed through the wall of the thrust member 56 are a plurality of ports 59 respectively communicating between the oil chamber 58 and the bearing surfaces 57. A cover 60 is provided to cooperate with the bed 50 in completely enclosing the thrust member 56, substantially in the manner shown. It is preferred that suitable sealing means, indicated at 61, be utilized between the thrust member 56 and the housing including the cover 60 and the bed 50. This may best be accomplished by extending a flange 62 outwardly from each end of the thrust member 56 in a position to cooperate with the housing to retain a packing washer or the like to prevent the escape of lubricant from the space between the housing and the thrust member 56.

As indicated at 65, the thrust member 56 is provided with an opening which extends through the wall thereof so as to communicate between the interior oil chamber 58 of the thrust member and the space within the cover 60. The cover 60 is provided with an oil plug 66 which is vented, as indicated at 67, or in any suitable manner, so that the interior of the housing formed by the cover 60 and the bed 50 and the interior oil chamber of the thrust member are at all times under atmospheric pressure.

In the operation of this form of my invention, suitable lubricant is introduced into the housing and into the interior oil chamber 58 so as to assume substantially the level indicated at 68 in Figs. 6 and 7. As the bearing surfaces 57 are alternately spaced from their complementary journaling surfaces 53 during the oscillation of the thrust member, as indicated at 69 in Figs. 6 and 7, a quantity of lubricant may flow under atmospheric pressure through the ports 59 between the spaced surfaces. As the oscillatory movement of the thrust member 56 continues from the extreme stage indicated in Fig. 6 toward the extreme stage indicated in Fig. 7, the lubricant is forced from between the bearing surfaces in response to the progressive pressure upon those surfaces as they are subjected to the bearing load.

My invention likewise contemplates other uses for my bearing than the two forms above discussed; for instance, such a bearing is particularly adapted for use as a connecting rod bearing for pistons to replace the usual wrist pin connection between a connecting rod and a piston. In Figs. 8 and 9 I show my bearing in connection with a piston of a type disclosed in connection with my copending application, Serial No. 103,169, filed September 29, 1936, for "Method and apparatus for counterbalancing oil well pumping apparatus." This type of piston is chosen for illustrative purposes only, and it should be understood that I do not wish to limit the use of my bearing in connection with pistons to the particular type of counterbalanced pistons illustrated, since the bearing may be used to replace the wrist pin of ordinary types of pistons.

In Figs. 8 and 9 I show a piston 70 which reciprocates in a cylinder 71, in this instance the piston being counterbalanced by fluid pressure so that when the piston 70 is forced downwardly by the oscillating connecting rod 72, it is forced upwardly on the return stroke of the connecting rod by fluid pressure below the piston. One simple adaptation of my bearing to such a piston includes a bed 73 positioned in a recess 74 in the upper end of the piston 70, the bed 73 providing offset journaling surfaces 75 and 76 which are arranged eccentric to each other and eccentric to the central axis of the piston, in a manner similar to the arrangement of the journaling surfaces of the two previously described forms of the invention. Secured, in any suitable manner, to the lower end of the connecting rod 72, is a thrust member 77 which provides relatively eccentric arcuate bearing surfaces 78 and 79 which are complementary to the journaling surfaces 75 and 76.

It will be seen that in operation, as the connecting rod reciprocates longitudinally of the cylinder 71 and at the same time oscillates laterally, as indicated by the arrow E of Fig. 9, the bearing surfaces 78 and 79 will alternately be spaced from their complementary journaling surfaces 75 and 76, and will in turn take the load or downward pressure on the bearing. In this embodiment of my invention, no provision is illustrated for introducing lubricant between the surfaces, since it is intended that the piston with which my bearing is illustrated in Figs. 8 and 9 will move in a bath of oil. In other instances, in which my novel bearing is embodied with pistons or the like which do not move in a bath of oil, suitable provision may be made in connection with the thrust member itself for supplying suitable lubricant to the spaced surfaces, in a manner similar to the previously described forms.

In the embodiment shown, I prefer to provide a retaining pin 80 extending laterally through the upper wall of the piston and through relatively enlarged openings 81 in the thrust member 77, to prevent complete separation of the thrust member from the bed 73. In the embodiment shown, the retaining pin 80 serves no other purpose, but in other instances a somewhat similar arrangement may be used when it is necessary that the piston 70 may be drawn upwardly by the connecting rod 72 rather than be forced upwardly by counterbalance fluid below the piston.

In each of the embodiments above described I have illustrated the thrust member of the bearing as being rotatable on a horizontal axis and the bearing surfaces subjected to vertical pressure. However, it should be clear that various embodiments of the invention, such as those illustrated, would be equally efficient in taking a horizontal load with the axis of rotation of the thrust member disposed either vertically or horizontally.

Another important feature of my invention resides in its adaptability for installation on existing equipment, for instance, on existing oil well walking beams of the standard type. In this connection it will be seen that a sleeve member similar to the thrust member 26 is adaptable for insertion over the connecting rod pin of a standard walking beam bearing, and a journal member having journaling surfaces complementary to the eccentrically disposed bearing surfaces of the insert sleeve could easily be provided to replace the standard journal member of existing walking beams. Likewise, the pitman bearing 17 illustrated in Figs. 5, 6, and 7 with its cooperating pitman 16 is adaptable for replacing the ordinary pitman and bearing of existing apparatus.

I have shown various features of my invention in rather detailed form, but in this connection it should be understood that I am aware of certain adaptations of my novel bearing to other forms of mechanism which have not been disclosed, and of various modifications that might be made in the three adaptations shown, without departing from the spirit and scope of my invention which should be interpreted solely by the appended claims.

I claim as my invention:

1. In a pumping apparatus of the character described, the combination of: a support member; a walking beam; and a bearing arranged to pivot said walking beam on said support to oscillate in a vertical plane, said bearing comprising a bed fixed to said support and providing a plurality of arcuate journaling surfaces offset in opposite directions with respect to a transverse plane through said surfaces, a thrust member fixed to said walking beam and providing a plurality of bearing surfaces respectively complementary to said journaling surfaces and being arranged so that as said walking beam oscillates a portion of the bearing surface offset in one direction is spaced from its journaling surface while the bearing surface offset in the other direction fully engages its journaling surface throughout the length thereof, and means for delivering lubricant between said bearing surfaces and said journaling surfaces while they are in spaced relation.

2. In a pumping apparatus of the character described, the combination of: a support member; a walking beam; and a bearing arranged to pivot said walking beam on said support to oscillate in a vertical plane, said bearing comprising a bed fixed to said support and providing a plurality of upwardly faced arcuate journaling surfaces alternately offset in opposite directions with respect to the central plane of said bearing member extending transversely through said surfaces, a thrust member fixed to said walking beam and providing a plurality of bearing surfaces respectively complementary to said journaling surfaces and being arranged so that as said walking beam oscillates a portion of each bearing surface offset in one direction is spaced from its journaling surface while the bearing surfaces offset in the other direction fully engage their journaling surfaces throughout the length thereof, and means for delivering lubricant between said bearing surfaces and said journaling surfaces while they are in spaced relation.

3. In a pumping apparatus of the character described, the combination of: a support member; a walking beam; and a bearing arranged to pivot said walking beam on said support to oscillate in a vertical plane, said bearing comprising a bed fixed to said support and providing a plurality of arcuate journaling surfaces alternately offset in opposite directions with respect to a transverse plane through said surfaces, a thrust member fixed to said walking beam and providing a plurality of bearing surfaces respectively complementary to said journaling surfaces and being arranged so that as said walking beam oscillates a portion of each bearing surface offset in one direction is spaced from its journaling surface while the bearing surfaces offset in the other direction fully engage their journaling surfaces throughout the length thereof, and said bearing having walls forming an oil chamber and ports communicating between said chamber and said surfaces whereby oil flows between said bearing surfaces and said journaling surfaces when they are spaced apart.

4. In a pumping apparatus of the character described, the combination of: a support member; a walking beam; and a bearing arranged to pivot said walking beam on said support to oscillate in a vertical plane, said bearing comprising a bed fixed to said support and providing a plurality of arcuate journaling surfaces alternately offset in opposite directions with respect to a transverse plane through said surfaces, a thrust member fixed to said walking beam and providing a plurality of bearing surfaces respectively complementary to said journaling surfaces and being arranged so that as said walking beam oscillates a portion of each bearing surface offset in one direction is spaced from its journaling surface while the bearing surfaces offset in the other direction fully engage their journaling surfaces throughout the length thereof, and said bearing having walls forming an oil chamber open to atmosphere and ports communicating between said chamber and said surfaces whereby oil flows at atmospheric pressure between said bearing surfaces and said journaling surfaces when they are spaced apart.

5. A bearing of the character described, including: a journal member providing a plurality of arcuate journaling surfaces relatively offset in opposite directions with respect to the central plane of said journal member transversely through said surfaces; a thrust member having a plurality of relatively offset bearing surfaces respectively complementary to said journaling surfaces for rotational oscillation thereon, the surfaces offset in opposite directions taking the load on the bearing in turn at different stages of the oscillation of said thrust member; and means for delivering lubricant to the surfaces not under load.

6. A bearing of the character described, including: a journal member providing a plurality of arcuate journaling surfaces relatively offset in opposite directions with respect to the central plane of said journal member transversely through said surfaces; a thrust member having a plurality of relatively offset bearing surfaces respectively complementary to said journaling surfaces for rotational oscillation thereon, the surfaces offset in opposite directions taking the load on the bearing in turn at different stages of the oscillation of said thrust member; and means for flowing oil at atmospheric pressure between the surfaces not under load.

7. In a bearing of the character described, the combination of: a thrust member having a plurality of arcuate convex bearing surfaces relatively offset on opposite sides of the axis of said thrust member; a journal member having a plurality of offset journaling surfaces respectively complementary to said bearing surfaces to support said thrust member for rotational oscillation, whereby portions of the bearing surfaces offset in one direction are spaced from their respective journaling surfaces while the surfaces offset in the other direction take the load of said thrust member; and walls forming an interior oil chamber in said thrust member and forming ports communicating between said chamber and said surfaces to deliver oil between the surfaces spaced apart.

8. In a bearing of the character described, the combination of: a thrust member having a plurality of arcuate convex bearing surfaces relatively offset on opposite sides of the axis of said thrust member; a journal member having a plurality of offset journaling surfaces respectively complementary to said bearing surfaces to support said thrust member for rotational oscillation, whereby portions of the bearing surfaces offset in one direction are spaced from their respective journaling surfaces while the surfaces offset in the other direction take the load of said thrust member; walls forming an oil reservoir in said journal member and open to the atmosphere; walls forming a chamber in said thrust member communicating with said reservoir to receive oil therefrom; and walls forming ports through which oil flows at atmospheric pressure from said chamber and said reservoir to the spaces between said surfaces.

9. In a pumping apparatus of the character described, the combination of: a support member; a walking beam; and a bearing arranged to pivot said walking beam on said support to oscillate in a vertical plane, said bearing comprising a bed fixed to said support and providing a pair of arcuate journaling surfaces offset in opposite directions with respect to a transverse plane through said surfaces, a thrust member fixed to said walking beam and providing a pair of bearing surfaces respectively complementary to said journaling surfaces whereby as said walking beam oscillates a portion of the bearing surface offset in one direction is spaced from its complementary journaling surface while the bearing surface offset in the other direction fully engages its complementary journaling surface throughout the length thereof, and means for delivering lubricant between said bearing surface and said journaling surface while they are in spaced relation.

10. A bearing for journaling an oscillation member, including: an oscillating thrust member having at least two arcuate bearing surfaces the centers of such arcuate surfaces being offset on opposite sides of the axis of said thrust member; a journal member having eccentric journaling surfaces respectively complementary to said bearing surfaces; and means for delivering lubricant at atmospheric pressure to said surfaces, the degree of eccentricity of said complementary surfaces being so related to the degree of oscillation of said thrust member that at certain stages during the oscillation thereof one journaling surface takes the load while another bearing surface is spaced from its complementary journaling surface throughout at least half of its length to permit a film of the lubricant utilized to flow between said surfaces.

11. A bearing of the character described, including: a thrust member; a plurality of elements fixedly related to said thrust member and providing arcuate convex bearing surfaces offset in opposite directions with respect to the central plane of said thrust member transversely through said bearing surfaces; and a journal member having offset journaling surfaces complementary to said bearing surfaces, the journaling surface offset in one direction taking the load of said thrust member at one stage in the rotation thereof and the journaling surface offset in the opposite direction taking the load of said thrust member at a different stage in the rotation thereof.

12. A bearing of the character described, including: a thrust member having bearing surfaces offset in opposite directions with respect to the central plane of said thrust member transversely through said bearing surfaces; and a journal for said thrust member having eccentric journaling surfaces complementary to said bearing surfaces of said thrust member, whereby when rotational movement of said thrust member occurs, the bearing surface offset in one direction moves out of contact with its complementary journaling surface, providing a lubricant space therebetween, and the bearing surface offset in the opposite direction moves into contact with its complementary journaling surface to take the load of said thrust member.

13. A bearing for journaling an oscillating member, including: an oscillating thrust member having at least two arcuate bearing surfaces arranged with their longitudinal dimension substantially at right angles to the axis of said thrust member, said bearing surfaces being offset on opposite sides of the axis of said thrust member; a journal member having eccentric journaling surfaces respectively complementary to said bearing surfaces; and means for delivering lubricant at atmospheric pressure to said surfaces, the degree of eccentricity of said complementary surfaces being so related to the degree of oscillation of said thrust member that at certain stages during the oscillation thereof one journaling surface takes the load while a portion of another bearing surface is spaced from its journaling surface a distance sufficient to permit film of the lubricant utilized to flow between said surfaces.

14. A bearing of the character described, including: a journal member providing a plurality of arcuate journaling surfaces relatively offset in opposite directions with respect to the central plane of said journal member transversely through said surfaces, said offset surfaces providing opposing shoulders extending over at least a portion of their length; a thrust member having a plurality of relatively offset bearing surfaces respectively complementary to said journaling surfaces for oscillation thereon, the surfaces offset in one direction being separated throughout a substantial portion of their extent during one stage in the oscillation of said thrust member and the surfaces offset in the opposite direction being separated throughout a substantial portion of their extent during a different stage in the oscillation of said thrust member, while said shoulders on said journal member resist lateral thrust; and means for delivering lubricant to the surfaces not under load.

15. A bearing of the character described, including: a journal member providing a plurality of arcuate journaling surfaces relatively offset in opposite directions with respect to the central plane of said journal member transversely through said surfaces, said offset surfaces providing opposing shoulders extending over at least a portion of their length; a thrust member having a plurality of relatively offset bearing surfaces respectively complementary to said journaling surfaces for oscillation thereon, whereby the surfaces offset in one direction take substantially all of the load on the bearing at one stage in the oscillation of said thrust member, and the surfaces offset in the opposite direction take substantially all of the load on the bearing at a different stage in the oscillation of said thrust member, and the bearing surfaces not under load being spaced from said journaling surfaces over substantial portions of their length and said shoulders on said journal member resisting lateral thrust; and means for flowing a lubricant at atmospheric pressure into the spaces between said surfaces not under load.

WALTER E. SAXE.